United States Patent [19]
Riddel

[11] 3,847,778
[45] Nov. 12, 1974

[54] AIR-FUEL RATIO SENSOR
[75] Inventor: John W. Riddel, Fenton, Mich.
[73] Assignee: General Motors Corporation, Detroit, Mich.
[22] Filed: Nov. 26, 1973
[21] Appl. No.: 418,824

[52] U.S. Cl. ............... 204/195 S, 60/276, 60/285, 60/289, 123/119 R, 123/119 E, 204/297 R, 204/1 T
[51] Int. Cl. ..................... G01n 27/46, F02m 7/00
[58] Field of Search .................... 60/276, 285, 289; 123/119 R, 119 E; 204/1 T, 195 S

[56] References Cited
UNITED STATES PATENTS

| | | |
|---|---|---|
| 3,347,767 | 10/1967 | Hickam .......................... 204/195 S |
| 3,616,274 | 10/1971 | Eddy .................................. 204/1 T |
| 3,738,341 | 6/1973 | Loos ............................... 123/119 R |
| 3,768,259 | 10/1973 | Carnahan et al. ..................... 60/276 |

Primary Examiner—T. Tung
Attorney, Agent, or Firm—Peter A. Taucher

[57] ABSTRACT

This invention relates to a sensor to sense the relative presence of oxygen in an automobile exhaust gas stream that includes a platinum coated zirconia element and a mounting means to hold the element in the exhaust stream. The zironcia element is generally hollow and cylindrical in shape having platinum electrodes on the inside and outside surfaces and is supported in the mounting means in such a manner that one end is closed and the interior open to atmosphere.

2 Claims, 2 Drawing Figures

AIR-FUEL RATIO SENSOR

A high temperature zirconia cell of the electrolyte type has been used as a sensor of unburned constituents in furnace stack gases, and is described in Hickman U.S. Pat. No. 3,347,767. A similar cell has been used as an automobile exhaust gas sensor, such a sensor being shown and described in Eddy U.S. Pat. No. 3,616,274.

In the general operation of such sensors, when the zirconia cell is activated by the heat of the exhaust gases passing around it, oxygen ions conduct through the cell from atmosphere to the outer electrode, the overall effect being to create a simple electrochemical cell which develops a potential difference between the two electrodes. The cell output voltage indicates the partial pressure of oxygen at the surface exposed to the exhaust gas. In use in an automobile, as the air-fuel ratio becomes leaner, the oxygen concentration in the exhaust gas increases, and the ratio of partial pressures between the outside and inside of the cell approaches unity whereupon the output voltage drops to near zero. When the air-fuel ratio becomes richer, oxidizable gases such as carbon monoxide and hydrogen exist. With such conditions, it is convenient to think of the sensor as a miniature electrochemical fuel cell in which these gases become a fuel source for the cell. At the exhaust side of the sensor the platinum electrode catalytically enhances chemical oxidation reaction which in turn depletes the concentration of oxygen at that surface. A low surface concentration of oxygen results and the sensor voltage rises to generate an EMF voltage signal proportional to the relative concentrations of combustible gases in the exhaust. This signal is used in combination with other components to adjust and maintain desired engine air fuel mixtures.

Prior art devices, constructed similar to that of the present invention and used in automobile exhaust systems generally include a mounting means to hold the zirconia cell, with the zirconia cell generally extending the full length of the interior of the mounting means. The end of the cell that extends into the exhaust stream extends substantially below the mounting means. With this arrangement, the zirconia cell requires a substantial amount of zirconia as well as platinum to make up the cell, and in addition such prior art devices use a rather expensive and seemingly cumbersome mounting means construction of sleeves and insulators to retain the zirconia cell.

The present invention uses a zirconia cell as an air-fuel ratio sensor in an automobile exhaust system to detect rich and lean air-fuel conditions. The zirconia cell is small and compact and therefore requires very little material to manufacture. This is a cost savings in the zirconia base element as well as a savings in the platinum used to make the electrodes. Also, the zirconia cell is held in the exhaust stream by a mounting device made up of parts that are relatively inexpensive to manufacture and are easily assembled.

It is therefore an object of this invention to provide an exhaust gas sensor that includes a zirconia cell that is small and compact and inexpensively manufactured.

A further object is to provide a high temperature exhaust gas sensor that includes a zirconia cell that is easily adaptable for mounting to a compact, easily and inexpensively manufactured mounting means.

Further objects and advantages of the present invention will be apparent from the following description, reference being made to the accompanying drawing in which.

Figure 1:
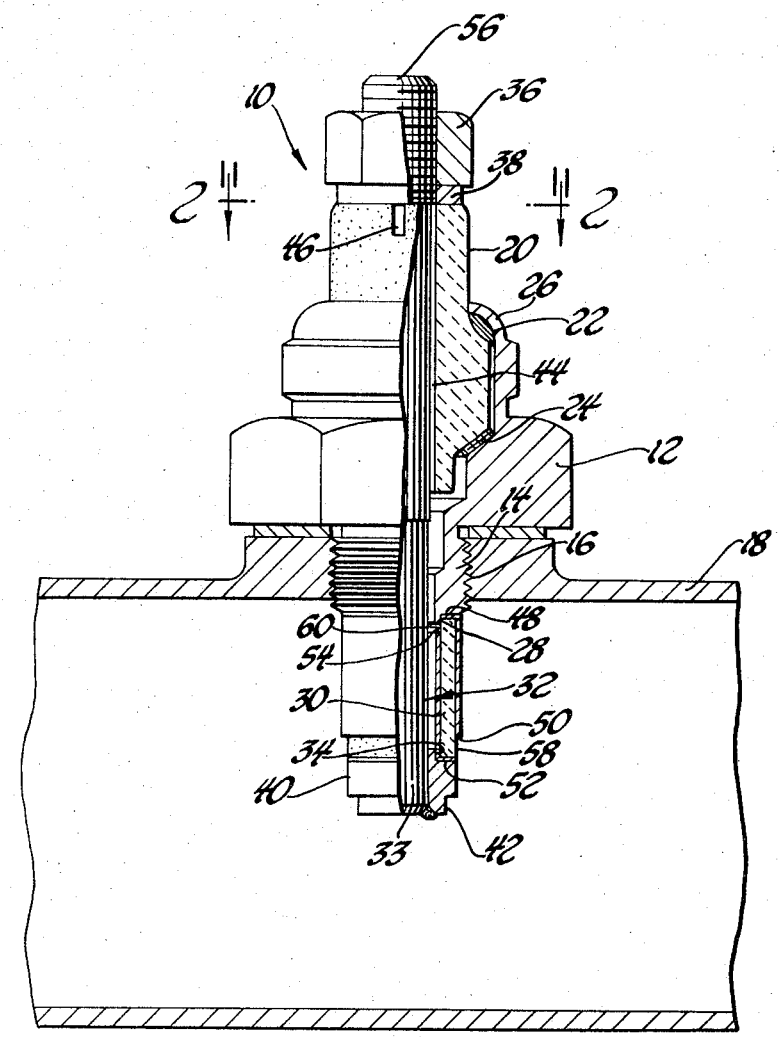
FIG. 1 is an elevational view of the invention showing the sensor in partial cross section and mounted in an exhaust pipe.

As shown, 10 indicates the assembled sensor made up of a hollow outer metal shell 12 that includes an integral extended body section 14 having a plurality of threads 16 thereon to threadedly mount the sensor to an automobile exhaust pipe 18. A U-shaped clamp encircling the exhaust pipe and having a lever member fitting over outer shell 12 could also be used to hold the sensor in place. A ceramic insulator 20 is held within the outer shell in a sealed relationship thereto by metal seals 22, 24 and the crimped over portion 26.

Body section 14 has a shoulder at 28 inwardly of the outer edge to hold one end of a hollow cylindrical shaped zirconia cell 30 while the fastener 32 which extends through the outer shell and ceramic insulator has a similar shoulder 34 thereon to hold the other end. Zirconia cell 30 has a platinum coating that begins at point 48 at the top end of the zirconia cell engaging body section 14 and which extends around the outside of the cell to a terminal point 50, a distance from the bottom end of the zirconia cell, to form an outer electrode on the cell. The outer electrode and grounded outer shell 12 provides a first contact means. A platinum coating is also included on the inside of the cell and begins at a point 52 on the bottom end of the zirconia cell and is in engagement with head 40 on retaining member 32 and extends around the inside of the zirconia cell to a terminal point 54 some distance from the top end of the zirconia cell to form an inner electrode on the cell. The inner electrode and retaining member provide a second contact means with terminal 56. Two sections 58 and 60 on cell 30 are not coated and therefore the inner and outer electrodes are physically and functionally separated from each other. It is apparent that the uncoated sections 58 and 60 may be located at the opposite ends from that shown in FIG. 1 to make the inner electrode a part of the grounded contact means and the outer electrode a part of the second contact means.

Fastener 32 is insulated from the outer metal shell by ceramic insulator 20 and as shown is a bolt 33 that includes a head 40, nut 36 and lock washer 38, which bolt extends within and through the outer shell and zirconia cell and above ceramic insulator 20 to hold the zirconia cell in a sealed position against the shoulder 28 on body section 14 and against shoulder 34 on fastener 32, to prevent exhaust gas from entering into the center of the cell. Head 40 may have a plurality of flat surfaces 42 that are used to hold the bolt while the nut 36 is tightened.

Figure 2:
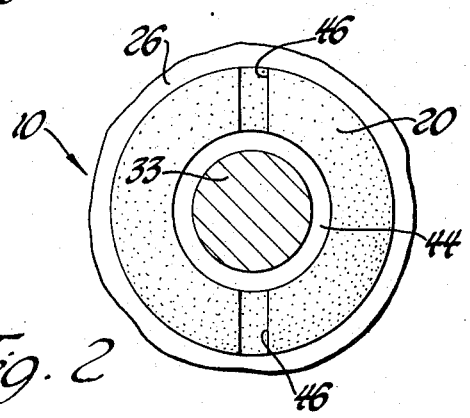
FIG. 2 is a cross sectional view taken along line 2—2 of FIG. 1.

Fastener 32 has an outside diameter that is less than the inside diameter of the ceramic insulator 20, outer shell 12 and the zirconia cell 30 to thereby establish an air passage 44 between the retainer and the ceramic insulator to allow air to pass into the interior of the sensor through openings 46 that are formed in the ceramic and which communicate with passage 44. This is best shown in FIG. 2.

The sensor as shown and described may be made economically and simply and so lends itself to mass production.

While the embodiments of the invention as herein disclosed constitute a preferred form, it is to be understood that other forms could be adopted.

I claim:

1. An exhaust gas sensor for measuring the relative presence of oxygen in the exhaust gas comprising: a hollow outer metal shell having a body section that is adapted to be mounted in an exhaust system, insulator means secured within said hollow metal shell, said body section having a shoulder thereon that is adapted to hold one end of a hollow cylindrical zirconia cell in fixed position, fastener means that includes a bolt portion also having a similar shoulder thereon in alignment with the shoulder on said body section to hold the other end of the zirconia cell, said fastener means extends through said zirconia cell, said insulator means, and said hollow outer metal shell, and is held in fixed position against the top of said insulator means by a securing means to create a seal between said zirconia cell, said body section, and said fastener means to prevent exhaust gases from entering the interior of the zirconia cell, the bolt portion of said fastener means being smaller in diameter than the inside diameter of said insulator, said outer shell, and said zirconia cell, to permit air to enter into said zirconia cell from an opening in said insulator means, said zirconia cell having a platinum coating on the inside surface and extending over onto an end surface thereof to form an inner electrode, a platinum coating on the outside surface of said zirconia cell and extending over onto the other end surface thereof to form an outer electrode, the inside and outside surface of said zirconia cell being uncoated at a section adjacent the ends of said zirconia cell to thereby insulate the inner electrode from the outer electrode, one of said electrodes and said metal shell forming a first contact means and the other of said electrodes and said fastener means forming a second contact means.

2. An exhaust gas sensor for measuring the relative presence of oxygen in the exhaust gas comprising: a hollow outer metal shell having a body section extending therefrom that is adapted to be mounted in an exhaust system, insulator means secured within said hollow outer metal shell; said body section having a shoulder thereon positioned within the exhaust system that positions and retains one end of a hollow cylindrical zirconia cell in fixed position against the shoulder and the bottom of said body section, fastener means that includes a bolt portion having threads at one end and a shoulder similar to the shoulder on said body section at the other end in alignment with the shoulder on said body section to hold the other end of the zirconia cell in alignment therewith, said fastener means extends through said insulator means, said zirconia cell, and said hollow outer metal shell, and is held in fixed position against the top of said insulator by a nut and washer to hold said fastener means in a fixed position to create a seal between said fastener means, said zirconia cell, and said body section to prevent exhaust gases from entering the interior of the zirconia cell, the bolt portion of said fastener means being smaller in diameter than the inside of said insulator, said outer shell, and said zirconia cell, to permit air to enter into said zirconia cell from a plurality of openings in said insulator means, said zirconia cell having a platinum coating on the inside surface that extends over the end surface in contact with said fastener means to form an inner electrode, and a similar platinum coating on the outside surface that extends over the end surface in contact with said body section to form an outer electrode, with the inside and outside surfaces of said zirconia cell being uncoated at a section adjacent the ends of said zirconia cell to thereby insulate the inner electrode from the outer electrode, one of said electrodes and said hollow outer metal shell forming a first contact means and the other of said electrodes and said fastener means forming a second contact means.

* * * * *